United States Patent
Wang et al.

(10) Patent No.: US 8,605,264 B2
(45) Date of Patent: Dec. 10, 2013

(54) APPARATUS AND METHOD FOR QUANTIFYING RESIDUAL STRESS OF A BIREFRINGENT MATERIAL

(75) Inventors: Wei-Chung Wang, Hsinchu (TW); Chi-Hung Huang, Hsinchu (TW); Yu-Cheng Tseng, Hsinchu (TW); Po-Chi Sung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 372 days.

(21) Appl. No.: 13/158,434

(22) Filed: Jun. 12, 2011

(65) Prior Publication Data

US 2012/0176598 A1    Jul. 12, 2012

(30) Foreign Application Priority Data

Jan. 12, 2011    (TW) .............................. 100101090 A

(51) Int. Cl.
   *G01B 11/16*    (2006.01)
(52) U.S. Cl.
   USPC .......................................................... 356/33
(58) Field of Classification Search
   USPC ................. 356/32–35.5, 243.1, 243.4, 243.8, 356/365–366; 250/559.09, 225
   See application file for complete search history.

(56) References Cited

U.S. PATENT DOCUMENTS

| | | | | |
|---|---|---|---|---|
| H76 H | * | 7/1986 | Cotterman | 356/33 |
| 5,191,387 A | * | 3/1993 | Ichikawa et al. | 356/34 |
| 5,400,131 A | * | 3/1995 | Stockley et al. | 356/33 |
| 5,410,917 A | * | 5/1995 | Giversen et al. | 73/800 |
| 5,694,205 A | * | 12/1997 | Gualtieri et al. | 356/33 |
| 6,219,131 B1 | * | 4/2001 | Zhang et al. | 356/35.5 |
| 6,219,139 B1 | * | 4/2001 | Lesniak | 356/366 |

* cited by examiner

*Primary Examiner* — Gregory J Toatley
*Assistant Examiner* — Dominic J Bologna
(74) *Attorney, Agent, or Firm* — Ditthavong Mori & Steiner, P.C.

(57) ABSTRACT

An apparatus for quantifying residual stress of a birefringent material comprises a light source generating light; a vertical polarizer converting a beam of light into a beam with vertical polarization; a standard material being mounted in front of the vertical polarizer; a horizontal polarizer converting a beam of light into a beam with horizontal polarization; an applied force unit applying different forces to the standard material; a spectrometer being mounted in front of the horizontal polarizer and recording intensity of light passing through the horizontal polarizer and transmittance of the standard material and a processing module being connected to the spectrometer, deriving a stress formula from the applied forces and transmittances of the standard material and obtaining a stress distribution of the birefringent material. A method for quantifying residual stress of a birefringent material is also disclosed.

12 Claims, 4 Drawing Sheets

APPARATUS AND METHOD FOR QUANTIFYING RESIDUAL STRESS OF A BIREFRINGENT MATERIAL

FIELD OF THE INVENTION

The present invention is an apparatus and a method for quantifying residual stress of a birefringent material.

BACKGROUND OF THE INVENTION

A conventional photoelastic method is a real time, whole field, highly sensitive and non-destructive method that determines stress distribution in a birefringent material.

There are two kinds of birefringent material, permanent birefringent material and temporary birefringent material. The permanent birefringent material is a material that has birefringence permanently. The temporary birefringent material is a material that exhibits birefringence when it is loaded and the birefringence disappears when the material is unloaded.

Birefringence is the decomposition of a ray of light into two rays when it passes through the birefringent material, depending on the polarization of the light.

Polarization is a property of waves that describes orientation of their oscillations. Electromagnetic waves, such as light and gravitational waves, exhibit polarization.

U.S. Pat. No. 5,400,131 discloses a method for measuring stress in an object of birefringent materials. The stress has both magnitude and direction. The method comprises steps of passing polarized light of first, second and third wavelengths through an object and an analyzer to produce respective fringe patterns, measuring and recording intensities of light for each wavelength emitted from the analyzer for multiple positions in the respective fringe patterns and combining the recorded intensities for the first, second and third wavelengths to form a ramp map having discontinuities at predetermined values of stress and converting the ramp map to a stress map indicating the magnitude of the stress in the object as a function of position within the object, which cannot quantify residual stress precisely because each predetermined value comes from a different source.

Accordingly, a new apparatus and method are needed to quantify residual stress of a birefringent material.

SUMMARY OF THE INVENTION

The primary objective of the present invention is to quantify residual stress of a birefringent material, and the present invention comprises an apparatus and a method.

The apparatus to quantify residual stress of a birefringent material in accordance with the present invention sequentially comprises a light source, a vertical polarizer, a standard material, a horizontal polarizer, an applied force unit, a spectrometer and a processing module. The processing module is connected to the spectrometer, derives a stress formula from applied forces and transmittances of the standard material and obtains a stress distribution of the birefringent material using the stress formula and transmittance of the birefringent material.

The method in accordance with the present invention controls an apparatus for quantifying residual stress of a birefringent material consisting of a light source, a vertical polarizer, a standard material, a horizontal polarizer, an applied force unit, a spectrometer and a processing module and comprises steps of applying different applied forces to the standard material, recording intensity of light passing through the horizontal polarizer and obtaining transmittances of the standard material, obtaining a relationship of the applied forces and transmittances of the standard material by repeating the applying and the recording steps, deriving a stress formula from the relationship and obtaining a stress distribution of the birefringent material by the stress formula and transmittance of the birefringent material.

DETAILED DESCRIPTION OF THE PRESENT INVENTION

Figure 1:
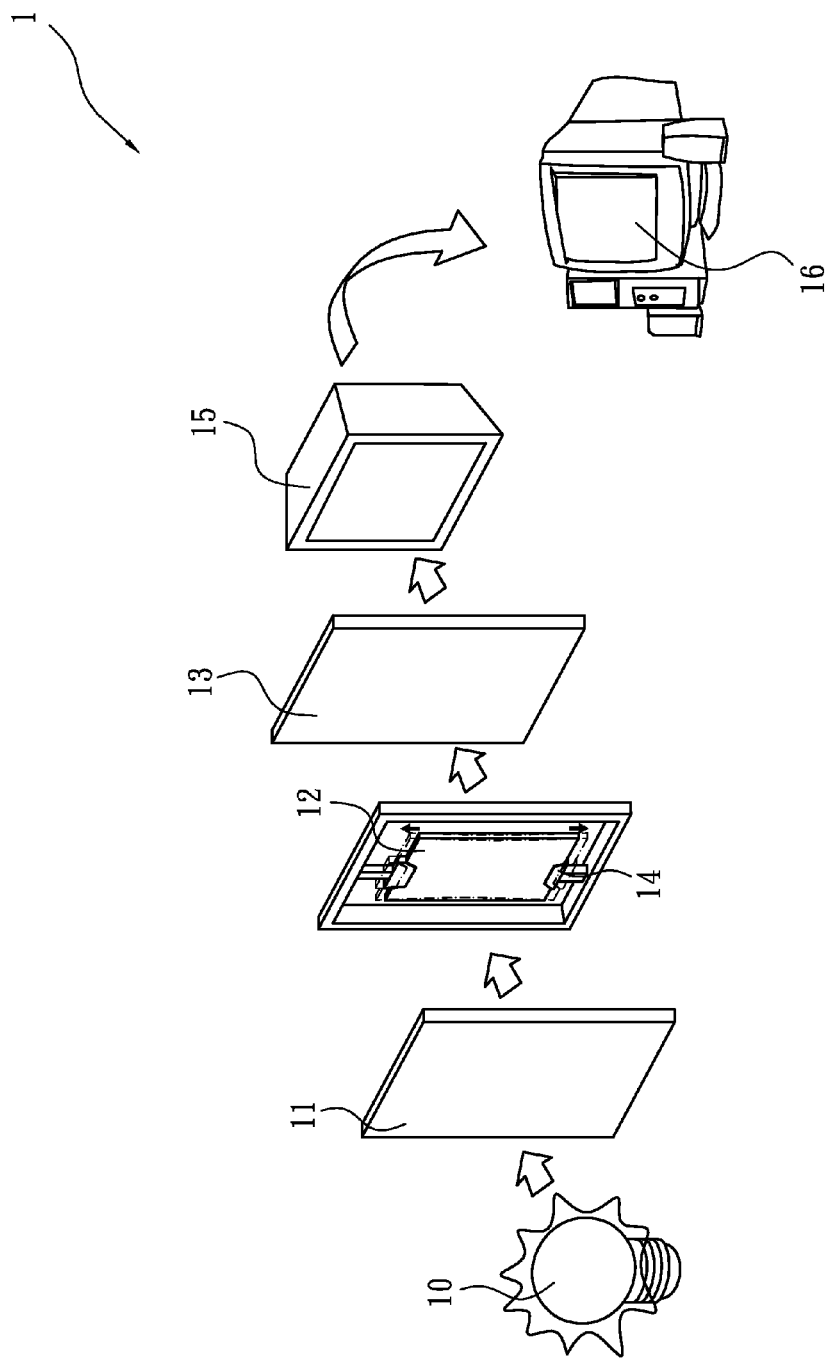
FIG. 1 is an exploded perspective view of an apparatus for quantifying residual stress of a birefringent material in accordance with the present invention.

With reference to FIG. 1, an apparatus for quantifying residual stress of a birefringent material (1) in accordance with the present invention comprises a light source (10), a vertical polarizer (11), a standard material (12), a horizontal polarizer (13), an applied force unit (14), a spectrometer (15) and a processing module (16).

The birefringent material may be a permanent birefringent material or a temporary birefringent material.

The light source (10) generates light that may be white light or monochromatic light.

The vertical polarizer (11) is mounted in front of the light source (10) and converts a beam of light into a beam with vertical polarization.

The standard material (12) is mounted in front of the vertical polarizer (11), is the same material as the birefringent material and is a birefringent flat plate without residual stress.

The horizontal polarizer (13) is mounted in front of the standard material (12) and converts a beam of light passing through the standard material (12) into a beam with horizontal polarization.

The applied force unit (14) applies different forces to the standard material (12) and may be a step motor or a manual applied force unit.

The spectrometer (15) is mounted in front of the horizontal polarizer (13) and records intensity of light passing through the horizontal polarizer (13) and transmittance of the standard material (12).

The processing module (16) is connected to the spectrometer (15), derives a stress formula from the applied force and transmittances of the standard material (12), obtains a stress distribution of the birefringent material using the stress formula and transmittance of the birefringent material and may be a computer. Obtaining the transmittance of the birefringent material may be obtained by a two step process. The two steps are replacing the standard material (12) with the birefringent material and recording the intensity of light passing through the horizontal polarizer (13).

Figure 2:
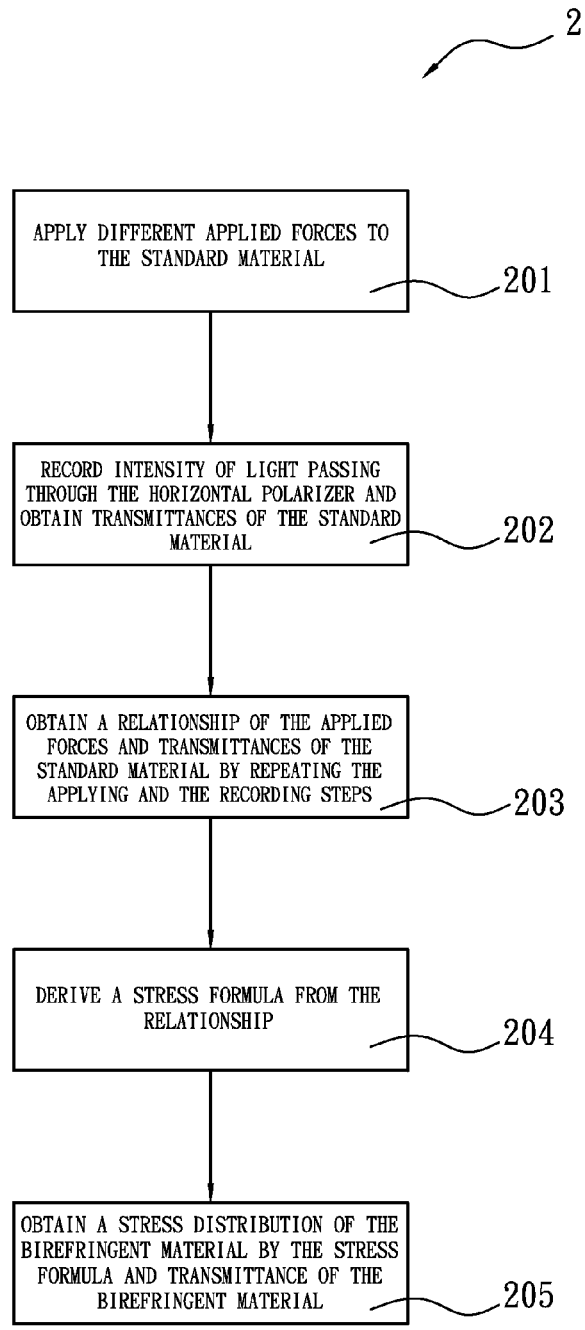
FIG. 2 is a flowchart of a first embodiment of a method for quantifying residual stress of a birefringent material in accordance with the present invention.
Figure 3:
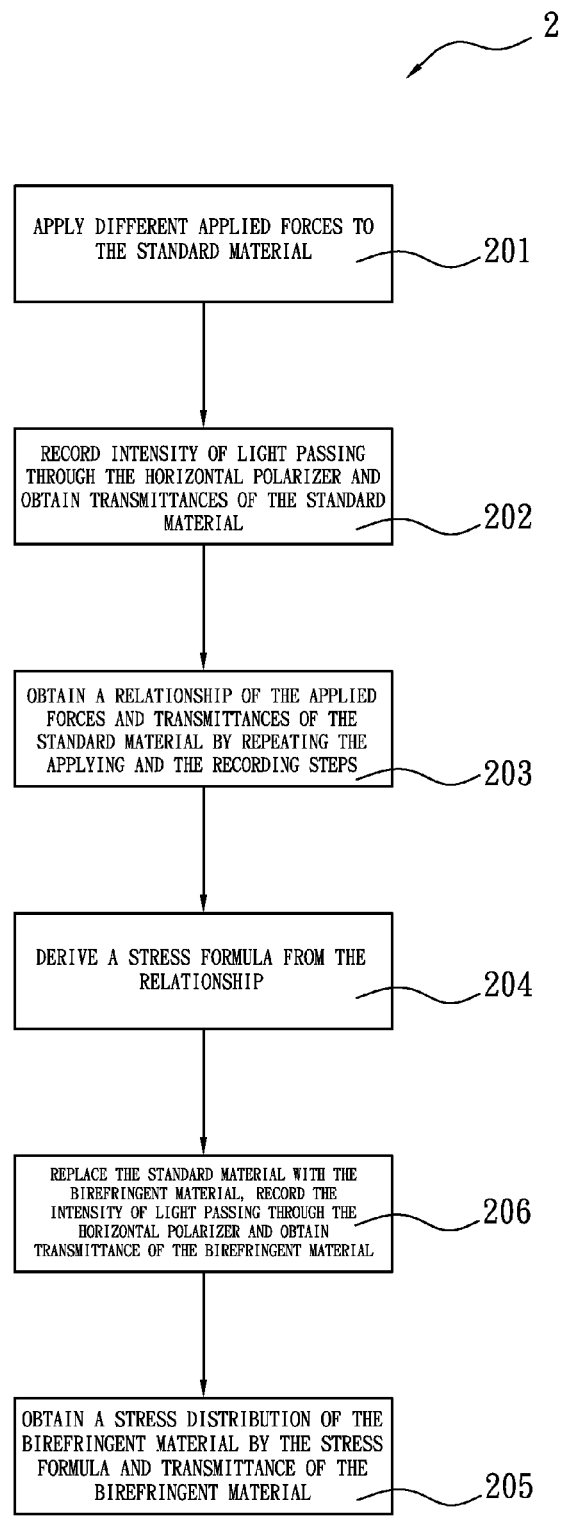
FIG. 3 is a flowchart of a second embodiment of a method for quantifying residual stress of a birefringent material in accordance with the present invention.

With further reference to FIGS. 2 and 3, a method for quantifying residual stress of a birefringent material (2) in accordance with the present invention controls an apparatus for quantifying residual stress of a birefringent material (1) consisting of a light source (10), a vertical polarizer (11), a standard material (12), a horizontal polarizer (13), an applied force unit (14), a spectrometer (15) and a processing module (16) and comprising steps of step 201 applying different applied forces to the standard material (12), step 202 recording intensity of light passing through the horizontal polarizer (13) and obtaining transmittances of the standard material (12), step 203 obtaining a relationship of the applied forces and transmittances of the standard material (12) by repeating step 201 and step 202, step 204 deriving a stress formula from the relationship, optional step 206 replacing the standard material (12) with the birefringent material, recording the intensity of light passing through the horizontal polarizer (13) and obtaining transmittance of the birefringent material and step 205 obtaining the stress distribution of the birefringent material by the stress formula and transmittance of the birefringent material.

Step 202 is performed by the spectrometer (15).

Figure 4:
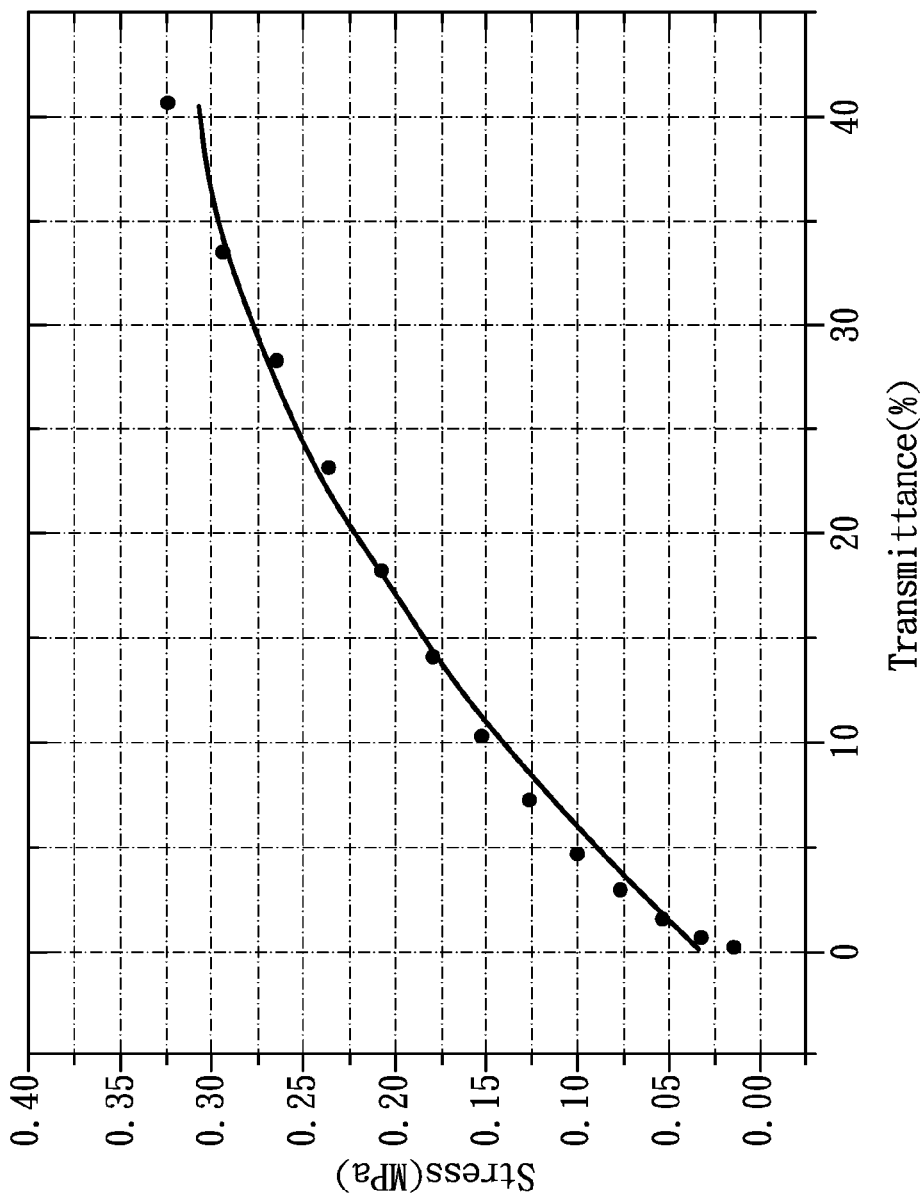
FIG. 4 is a graph of applied force and transmittance of a birefringent material.

With further reference to FIG. 4, a relationship of the applied forces and transmittances of the standard material (12) may be depicted in a graph. Each point represents one time of step 202, and a curved line represents the relationship of the applied forces and transmittances of the standard material (12), comes from all points and can derive a stress formula:

$$S = -1.2924T^2 + 1.204T + 0.0333;$$

S represents stress distribution and T represents transmittance.

If the transmittance of the birefringent material had been known to be 20%, then the stress distribution of the birefringent material equals:

$$-1.2924(20\%)^2 + 1.204(20\%) + 0.0333 = 0.222 \text{ MPascal}.$$

Various changes can be made without departing from the broad spirit and scope of the invention.

What is claimed is:

1. An apparatus for quantifying residual stress of a birefringent material comprising
    a light source generating light;
    a vertical polarizer being mounted in front of the light source and converting a beam of light into a beam with vertical polarization;
    a standard material being mounted in front of the vertical polarizer, being the same material as the birefringent material and being a birefringent flat plate without residual stress;
    a horizontal polarizer being mounted in front of the standard material and converting a beam of light passing through the standard material into a beam with horizontal polarization;
    an applied force unit applying different forces to the standard material;
    a spectrometer being mounted in front of the horizontal polarizer and recording intensity of light passing through the horizontal polarizer and transmittance of the standard material; and
    a processing module being connected to the spectrometer, deriving a stress formula from the applied forces and transmittances of the standard material and obtaining a stress distribution of the birefringent material using the stress formula and transmittance of the birefringent material.

2. The apparatus as claimed in claim 1, wherein the transmittance of the birefringent material is obtained by at a two step process, the two steps being replacing the standard material with the birefringent material and recording intensity of light passing through the horizontal polarizer.

3. The apparatus as claimed in claim 1, wherein the birefringent material is a permanent birefringent material.

4. The apparatus as claimed in claim 1, wherein the birefringent material is a temporary birefringent material.

5. The apparatus as claimed in claim 1, wherein the applied force unit is a step motor.

6. The apparatus as claimed in claim 1, wherein the applied force unit is a manual applied force unit.

7. The apparatus as claimed in claim 1, wherein the light is white light.

8. The apparatus as claimed in claim 1, wherein the light is monochromatic light.

9. The apparatus as claimed in claim 1, wherein the processing module is a computer.

10. A method for quantifying residual stress of a birefringent material that controls an apparatus for quantifying residual stress of a birefringent material consisting of a light source, a vertical polarizer, a standard material, a horizontal polarizer, an applied force unit, a spectrometer and a processing module and comprising steps of
    applying different applied forces to the standard material;
    recording intensity of light passing through the horizontal polarizer and obtaining transmittances of the standard material;
    obtaining a relationship of the applied forces and transmittances of the standard material by repeating steps of applying different applied forces and recording intensity of light passing through the horizontal polarizer;
    deriving a stress formula from the relationship; and
    obtaining a stress distribution of the birefringent material by the stress formula and transmittance of the birefringent material.

11. The method for quantifying residual stress of a birefringent material as claimed in claim 10 further comprising a step of replacing the standard material with the birefringent material, recording the intensity of light passing through the horizontal polarizer and obtaining transmittance of the birefringent material.

12. The method for quantifying residual stress of a birefringent material as claimed in claim 10, wherein the recording step is achieved by the spectrometer.

* * * * *